US008176179B2

(12) United States Patent
Worley et al.

(10) Patent No.: US 8,176,179 B2
(45) Date of Patent: May 8, 2012

(54) METHOD AND SYSTEM FOR DATA-STRUCTURE MANAGEMENT

(75) Inventors: John S. Worley, Fort Collins, CO (US); Hugh Mahon, Fort Collins, CO (US)

(73) Assignee: Secure64 Software Corporation, Greenwood Village, CO (US)

( * ) Notice: Subject to any disclaimer, the term of this patent is extended or adjusted under 35 U.S.C. 154(b) by 1347 days.

(21) Appl. No.: 11/732,710

(22) Filed: Apr. 3, 2007

(65) Prior Publication Data
US 2008/0016216 A1  Jan. 17, 2008

Related U.S. Application Data

(60) Provisional application No. 60/789,085, filed on Apr. 3, 2006.

(51) Int. Cl.
*G06F 15/173* (2006.01)
*G06F 3/00* (2006.01)
(52) U.S. Cl. .......................... 709/226; 710/54
(58) Field of Classification Search ............ 709/226; 710/39, 53.54; 370/395.71, 395.72, 395.7, 370/415, 417
See application file for complete search history.

(56) References Cited

U.S. PATENT DOCUMENTS

| 6,131,113 | A | * | 10/2000 | Ellsworth et al. | 709/213 |
| 6,134,217 | A | * | 10/2000 | Stiliadis et al. | 370/232 |
| 6,148,365 | A | * | 11/2000 | Buer | 711/110 |
| 6,396,843 | B1 | * | 5/2002 | Chiussi et al. | 370/418 |
| 6,795,886 | B1 | * | 9/2004 | Nguyen | 710/310 |
| 7,412,454 | B2 | * | 8/2008 | Davis et al. | 1/1 |

* cited by examiner

*Primary Examiner* — Yemane Mesfin
(74) *Attorney, Agent, or Firm* — Olympic Patent Works PLLC (57) ABSTRACT

Embodiments of the present invention are directed to computationally efficient methods and systems for managing connection-associated and exchange-associated resources within network proxies. In one embodiment of the present invention, a circular connection-switch queue is employed for allocating, de-allocating, and maintaining connection-based and exchange-based data resources within a proxy. The connection-switch queue includes a free pointer that identifies a next connection-switch queue entry for allocation, and an idle pointer that is incremented continuously or at fixed intervals as timers associated with connection-switch entries expire. In an alternate embodiment, the connection-switch queue includes a free pointer, an idle pointer, and a clear pointer.

9 Claims, 15 Drawing Sheets

FIGURE 2B connection switch queue
CSQ

FIGURE 3C connection switch queue
CSQ

FIGURE 3D

FIGURE 3E connection switch queue
CSQ

FIGURE 3F connection switch queue
CSQ

FIGURE 4A connection switch queue
CSQ

METHOD AND SYSTEM FOR DATA-STRUCTURE MANAGEMENT

CROSS-REFERENCE TO RELATED APPLICATION

This application claims the benefit of Provisional Application No. 60/789,085, filed Apr. 3, 2006.

TECHNICAL FIELD

The present invention is related to data structures and computer networking and, in particular, to a data structure and a proxy-resource-management method that allows for computationally efficient management and allocation of data structures representing proxy resources.

BACKGROUND OF THE INVENTION

In various networking protocols, particularly protocols that allow for request/response client/server communications, provision is made for proxies that serve as intermediaries between clients and servers. When a proxy serves as an intermediary for the client and server, rather than a client directly transmitting requests to servers, and servers directly transmitting responses to clients, the client sends requests to the proxy, for forwarding by the proxy to the server, and the server sends responses back to the proxy, for forwarding back to the client. Proxies serve as a useful indirection within a network to allow for flexibility in application network location, load balancing, and for other reasons.

In certain protocols, each exchange of messages or packets between a client and server have deterministic and identifiable end points. In other words, at the onset of an exchange, the number of messages that will constitute the exchange of messages or packets can be determined. In other cases, the maximum amount of time that a connection between a client and server may remain open can be determined or specified. However, in connectionless network protocols, such as the IP User Datagram Protocol ("UDP"), a proxy cannot determine when an exchange of packets or messages begins or ends. In some cases, messages or packets may arrive at the proxy at any time as part of a connectionless, open-ended exchange of packets between two remote network entities. In other cases, a connection-based network protocol may allow for open-ended connections of indeterminate length. Open-ended or connectionless network protocols present a difficult problem for a proxy. In general, the proxy maintains information related to message exchanges, including network addresses and remote-entity identities, so that the proxy, upon receiving a next message or packet from a remote entity, can forward the message or packet to the corresponding remote entity of a pair of communicating remote entities as part of a connection-based, connectionless, or open-ended-connection-based network protocol. However, the proxy cannot determine for how long a connection may remain open, and as new packet or message exchanges are detected, and as resources are allocated for them, the proxy may end up managing increasingly large sets of resources devoted to current packet and message exchanges. These increasingly large sets of active resources may cause large computational overheads and efficiencies for proxies, as they seek to locate particular resources and add and delete resources from the set of active resources. For this reason, designers, developers, and users of networking protocols that provide for proxy intermediaries have all recognized the need for other methods and systems for managing resources by proxies.

SUMMARY OF THE INVENTION

Embodiments of the present invention are directed to computationally efficient methods and systems for managing connection-associated and exchange-associated resources within network proxies. In one embodiment of the present invention, a circular connection-switch queue is employed for allocating, de-allocating, and maintaining connection-based or exchange-based data resources within a proxy. The connection-switch queue includes a free pointer that identifies a next connection-switch queue entry for allocation, and an idle pointer that is incremented continuously or at fixed intervals as timers associated with connection-switch entries expire. In an alternate embodiment, the connection-switch queue includes a free pointer, an idle pointer, and a clear pointer.

DETAILED DESCRIPTION OF THE INVENTION

Embodiments of the present invention are directed to various types of connection-switch queues ("CSQs") that may be used by proxies in various types of networks for managing data resources associated with open or active message or packet exchanges and/or connections between remote entities. However, the CSQs may also find use in a variety of applications in which a pool of active data resources or data structures needs to be managed on a continuing basis, and when certain of the data resources or data structures have indefinite lifetimes.

Figure 1:
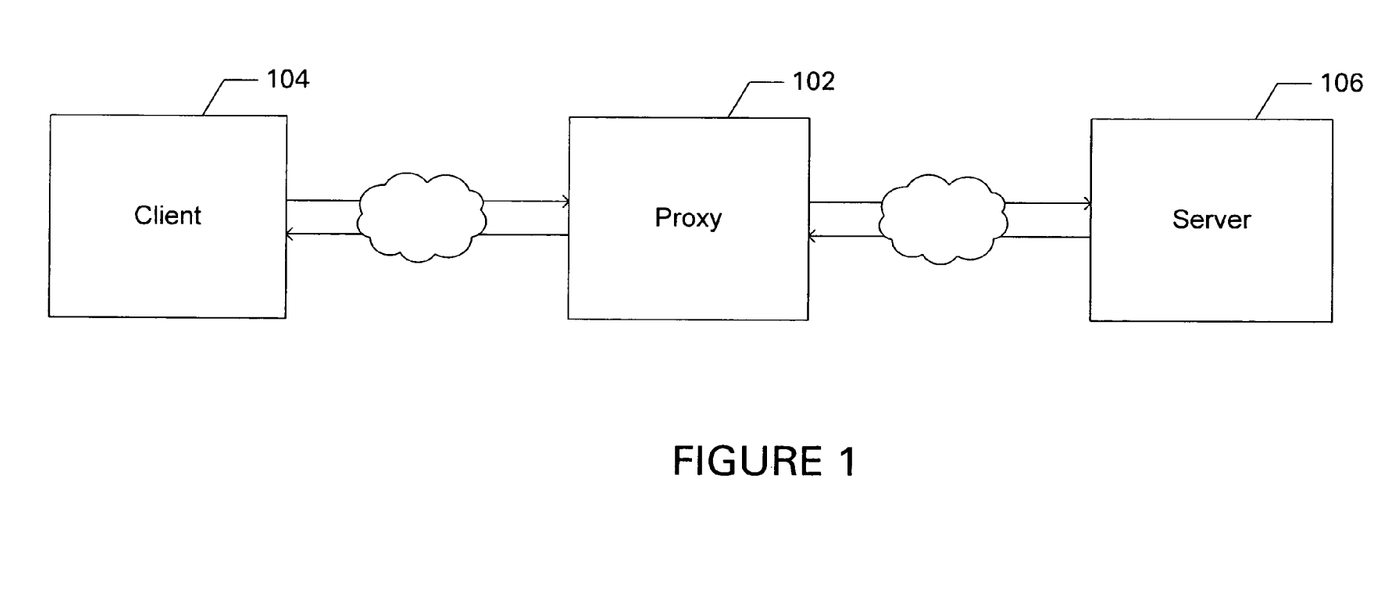
FIG. 1 shows a high-level illustration of a proxy within a network.

FIG. 1 shows a high-level illustration of a proxy within a network. The proxy 102 serves as an intermediary between a client 104 and server 106. Rather than the client and server directly exchanging messages or packets, the client transmits packets or messages for the server to the proxy 102, which, in turn, forwards the messages or packets to the server 106. Similarly, the server sends messages or packets in response to messages or packets received by the client to the proxy 102, rather than directly to the client 104. The proxy represents a level of indirection within a network that allows for a variety of conveniences, including network-address mobility of both clients and servers, as well as for intelligent load balancing and routing carried out on behalf of clients and servers by the proxy.

Figure 2A:
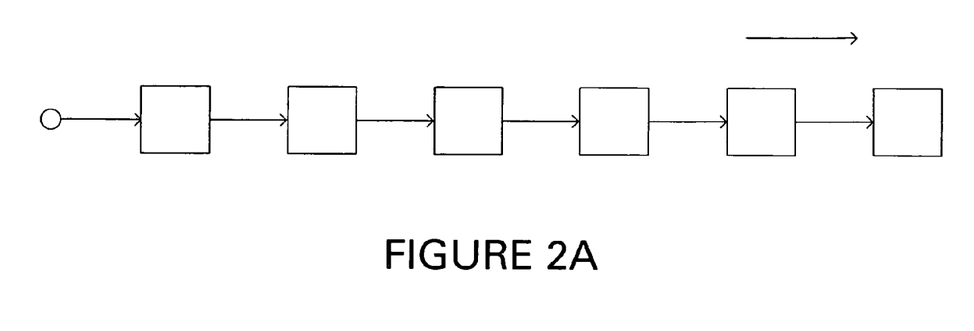
FIGS. 2A-B illustrate a linked list and stack, respectively.
Figure 2B:
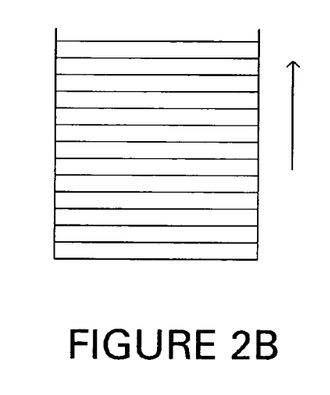

As discussed above, a proxy generally needs to allocate a data structure or data resource to store connection information for each active or open exchange of packets or messages between two remote network communicating entities. As also discussed above, in many network protocols, the length of time for which an exchange connection may be active is indefinite. Therefore, as the proxy continues to allocate new connection-associated resources for newly detected connections or exchanges, a set of active connection-associated resources may grow large and, in worse cases, may eventually exceed the capacity of the system on which the proxy runs. Currently, active connection-associated resources are stored in linked lists, stacks, or other such familiar data structures. FIGS. 2A-B illustrate a linked list and stack, respectively. In many current implementations, the connection-associated resources are further associated with timers which, upon expiration, cause the resources to be reclaimed and de-allocated. Unfortunately, as the number of active connection-associated resources stored within these types of data structures increase, computational overhead in managing the data structures as well as managing timer expiration and other maintenance tasks may also increase, and may represent serious additional levels of computational overhead and inefficiency for an already process-cycle-bound, busy proxy application.

Figure 3A:
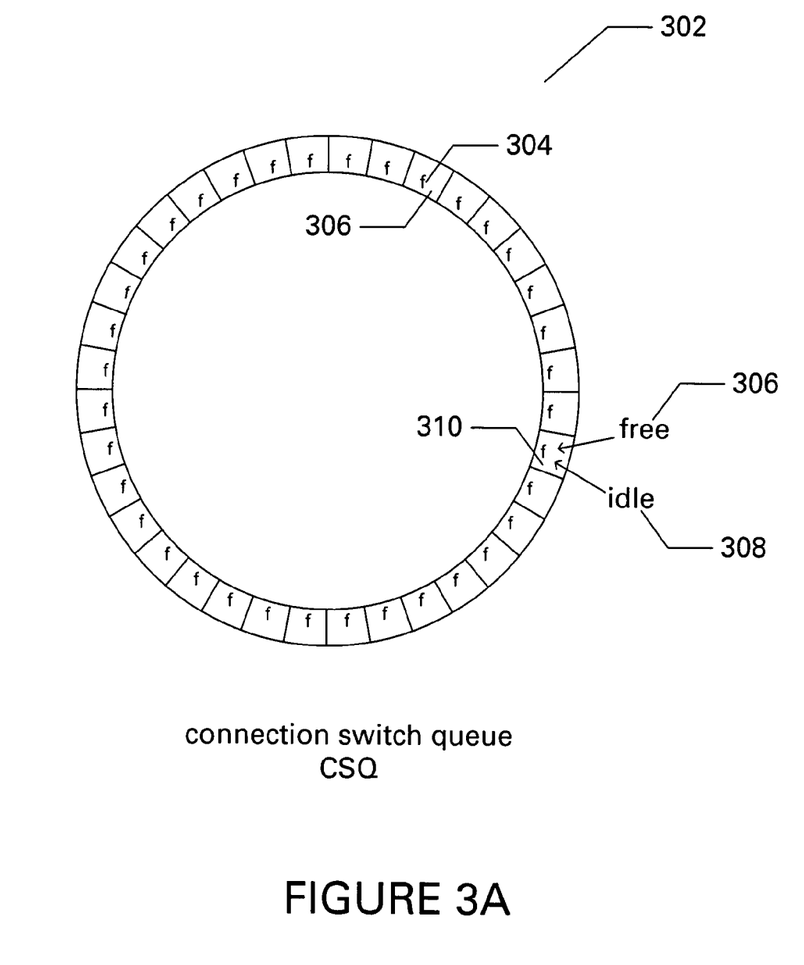
FIGS. 3A-3F illustrate a first embodiment of the present invention.

Embodiments of the present invention provide a more efficient connection-switch-queue data structure for managing active connection-associated data structures and/or data resources. FIGS. 3A-F illustrate a first embodiment of the present invention. FIG. 3A shows a just-initialized, empty connection-switch queue ("CSQ") that represents one embodiment of the present invention. The CSQ is a circular queue 302 containing some maximum, fixed number of connection-associated data resources. Each CSQ entry either contains the data-associated resource or contains a pointer to a data-associated resource. Each CSQ entry is associated with a status. The status may be: (1) free; (2) active; and (3) idle. Initially, all of the entries have status "free," as shown in FIG. 3A by the symbols "f" in each entry, such as the symbol "f" 304 in entry 306. The circular queues are, in fact, generally linear arrays or length lists that are referenced by modular arithmetic to appear to be circular, by well-known circular-queue techniques. The CSQ includes two pointers: "free," 306, which references the next CSQ entry that may be allocated for storing connection-associated information for a newly detected connection or exchange; and (2) "idle," 308, which references a CSQ entry that will next expire. CSQ entries are associated with timers or time values that indicate the remaining time before the entry expires. The time values may indicate a time of expiration relative to a previous entry, an absolute expiration time, or some other time-associated value that allows CSQ-management routines to determine when CSQ entries expire. Initially, as shown in FIG. 3A, both the free and idle pointers point to a single CSQ entry 310.

Figure 3B:
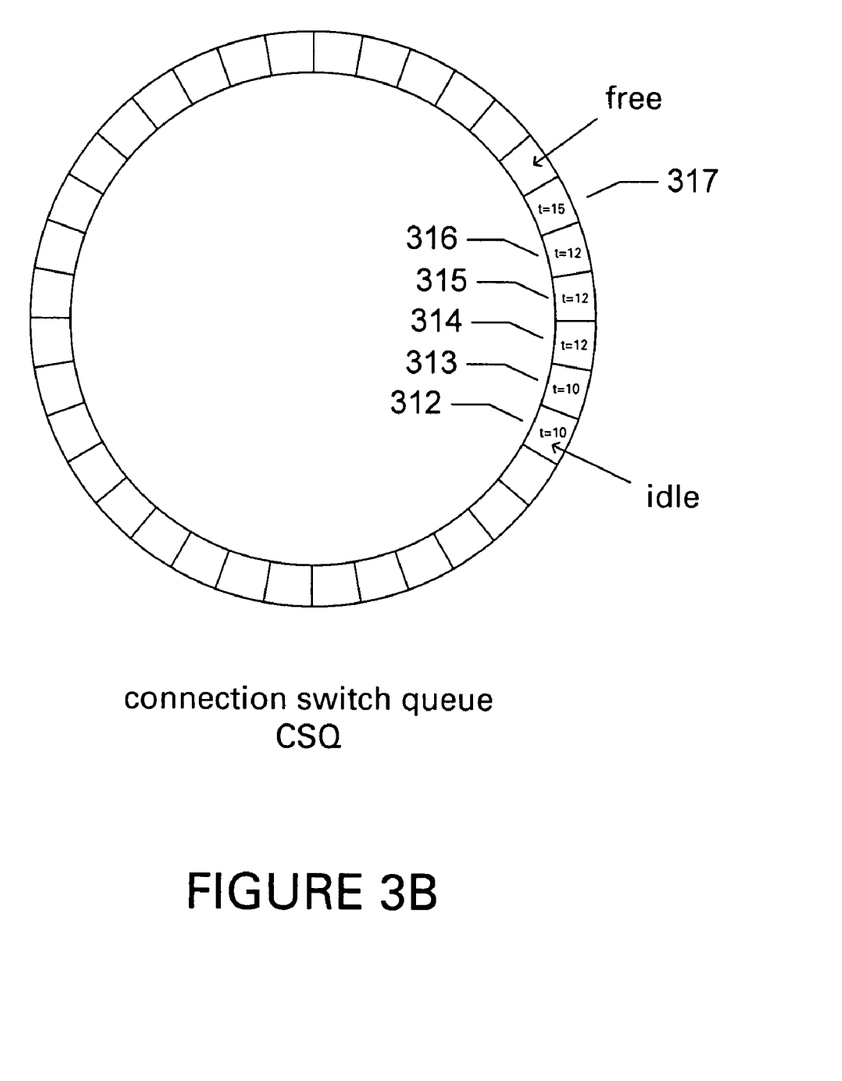

FIG. 3B shows the CSQ of FIG. 3A following allocation of six connection-associated data resources represented by or referenced by six CSQ entries the six CSQ entries 312-317 are shown, in FIG. 3B, with the timer values representing the time, in clock ticks or some other time-based value, meaning until the entries expire.

Figure 3C:
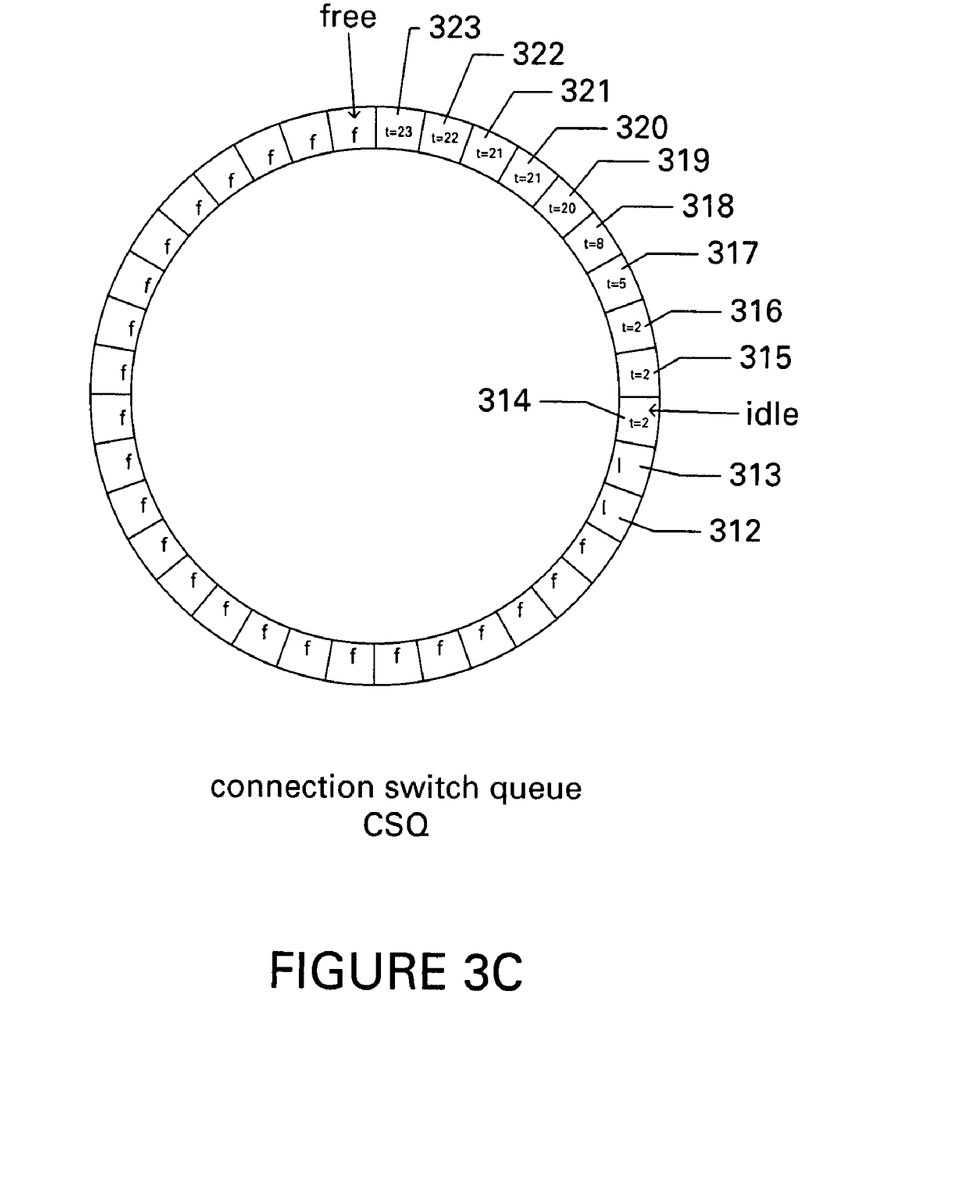

FIG. 3C shows the CSQ of FIG. 3B following 10 clock ticks or the passage of time responding to ten time increments. As is shown in FIG. 3C, the first two allocated CSQ entries 312 and 313 have since expired, and now have the status "idle," represented in FIG. 3C by the symbol "I." The time to expiration of the remaining, allocated CSQ entries already allocated at the point in time represented by FIG. 3B, 314-317, has been incremented by ten clock ticks, and six additional CSQ entries 318-323 have been allocated. Thus, the pointer "idle" is advanced, in a forward direction, to point to the next CSQ entry that will expire, while the pointer "free" is advanced to reference the next allocatable CSQ entry.

Figure 3D:
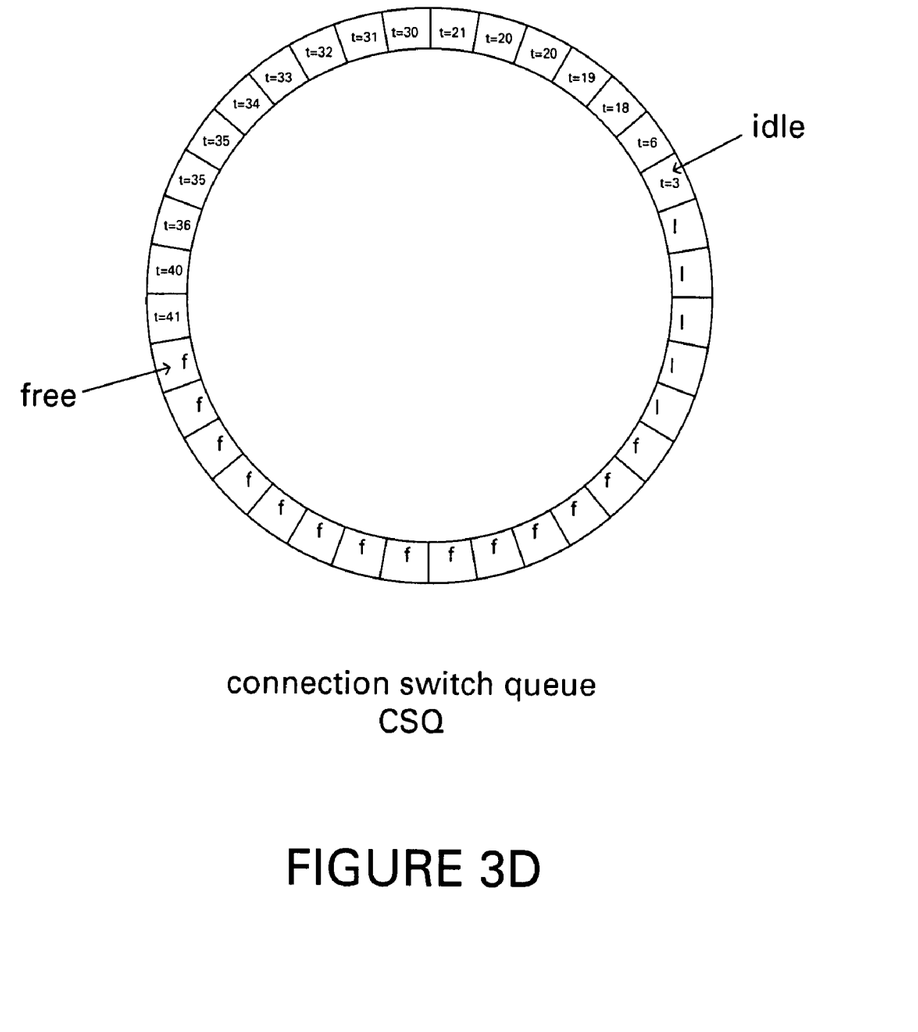

FIG. 3D shows the CSQ of FIG. 3C after two additional clock ticks. The pointer "idle" has advanced by three additional entries, and the pointer "free" has advanced by 11 entries.

Figure 3E:
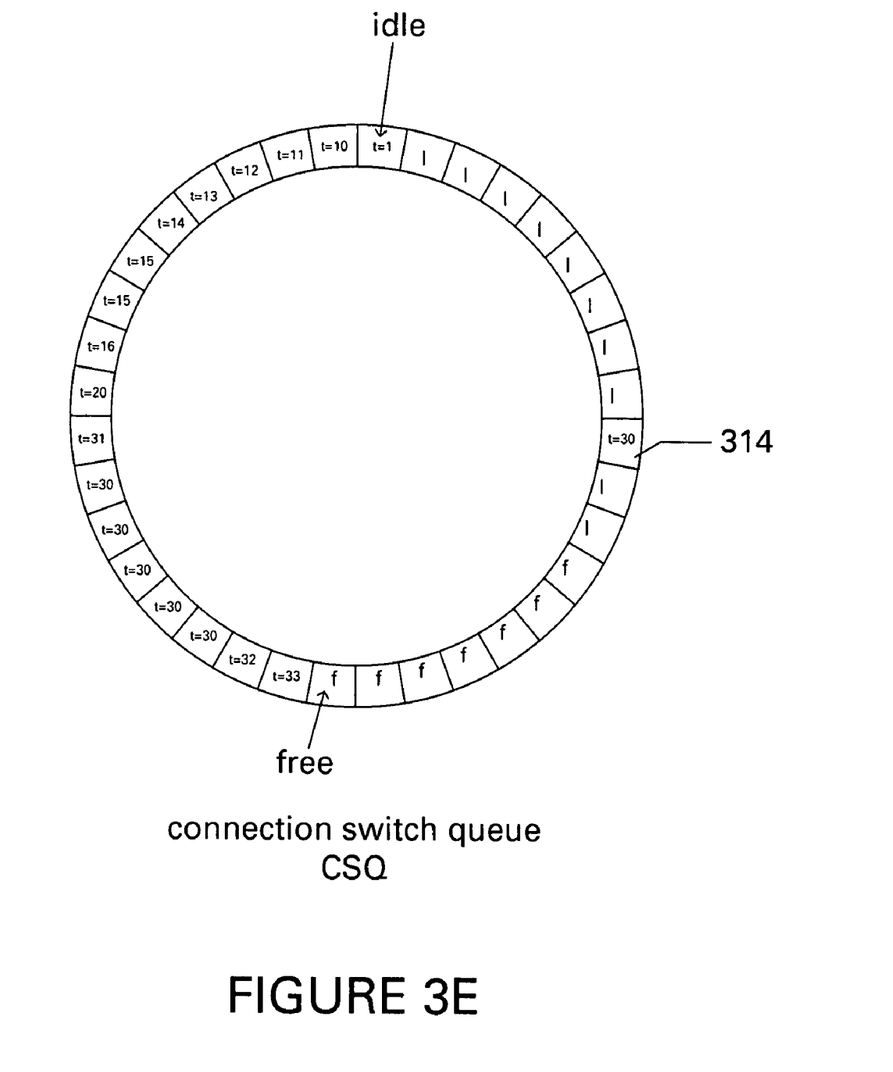

FIG. 3E shows the CSQ of FIG. 3D following ten additional clock ticks. Again, both the pointer "idle" and the pointer "free" have advanced. Additionally, CSQ entry 314, previously idle, has returned to an active state. This has occurred because the CSQ entry has been again accessed due to newly arriving packets or messages associated with the active connection or exchange represented by CSQ entry 314. In other words, although CSQ entries change from "free" status to "idle" status upon time expiration, the "idle" entries may return to active status when additional accesses occur before the entries are reallocated for another connection.

Figure 3F:
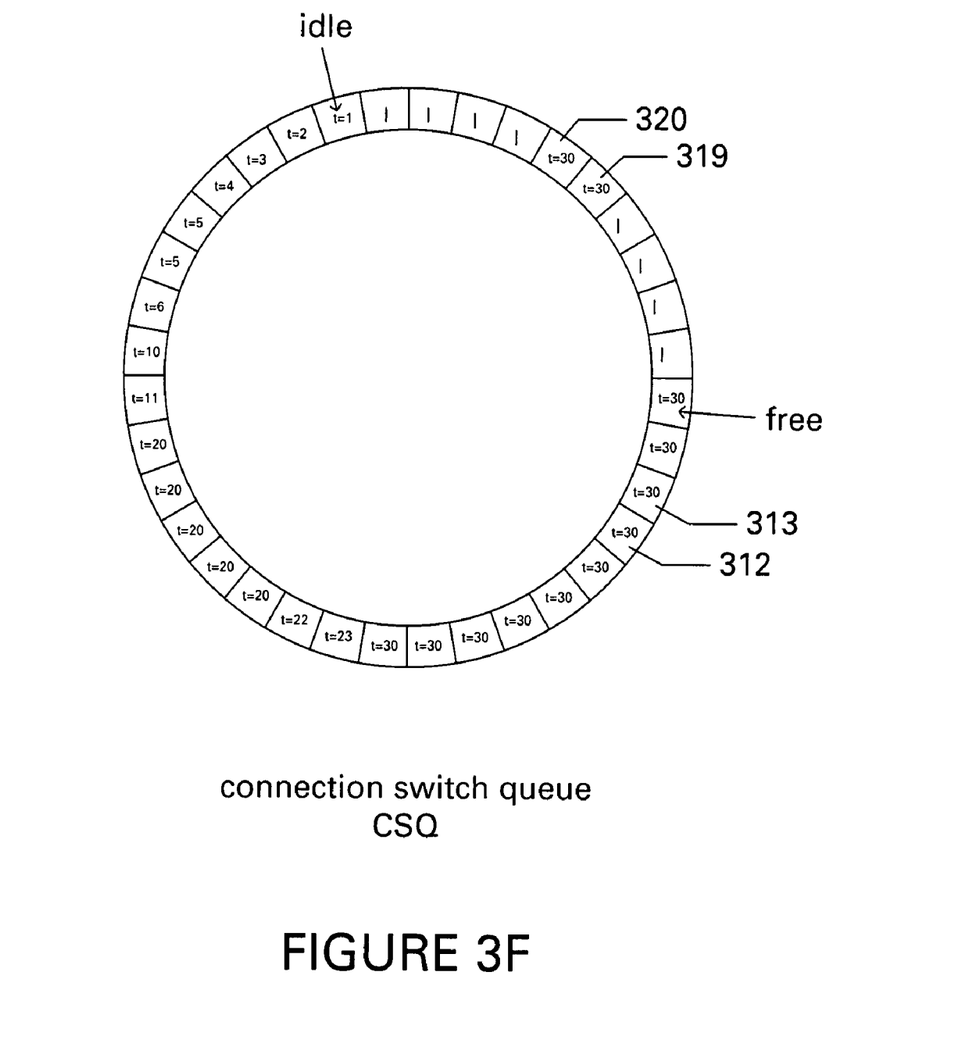

FIG. 3F shows the CSQ of FIG. 3E following expiration of an additional ten clocks. Two additional CSQ entries 319 and 320 have reverted from "idle" to "active" status as a result of subsequent access, while two formerly idle CSQ entries 312 and 313 have been reallocated for new connections or exchanges.

Figure 4A:
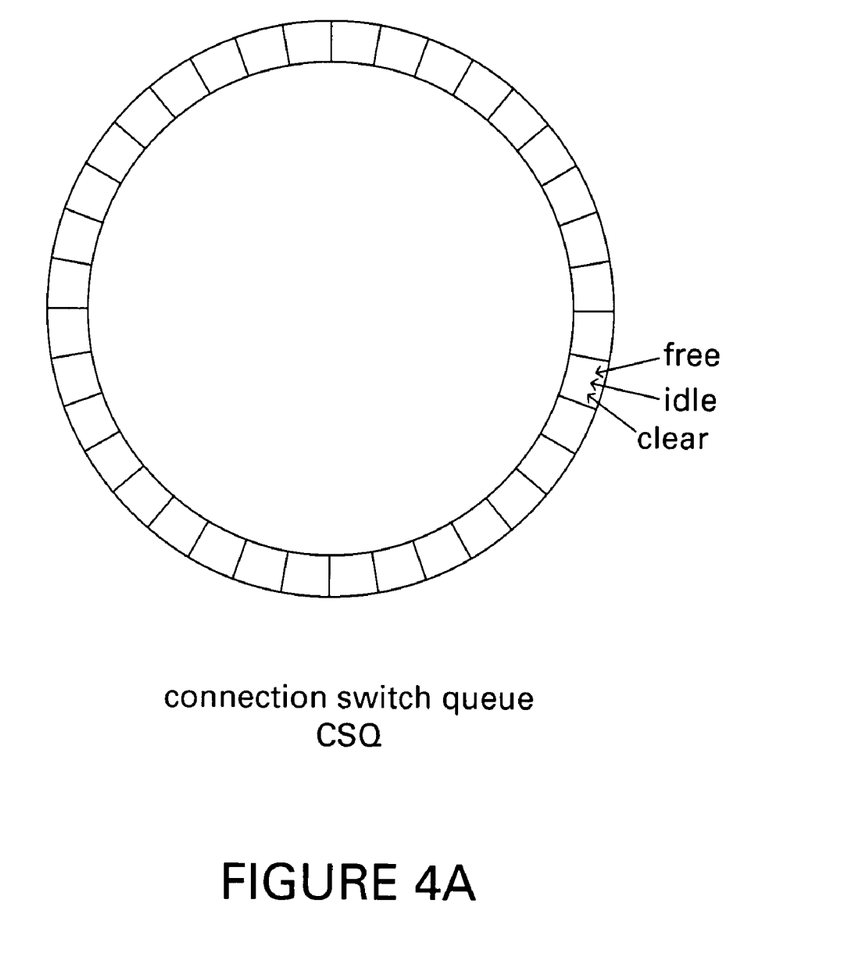
FIGS. 4A-D illustrate a second embodiment of the present invention.
Figure 4B:
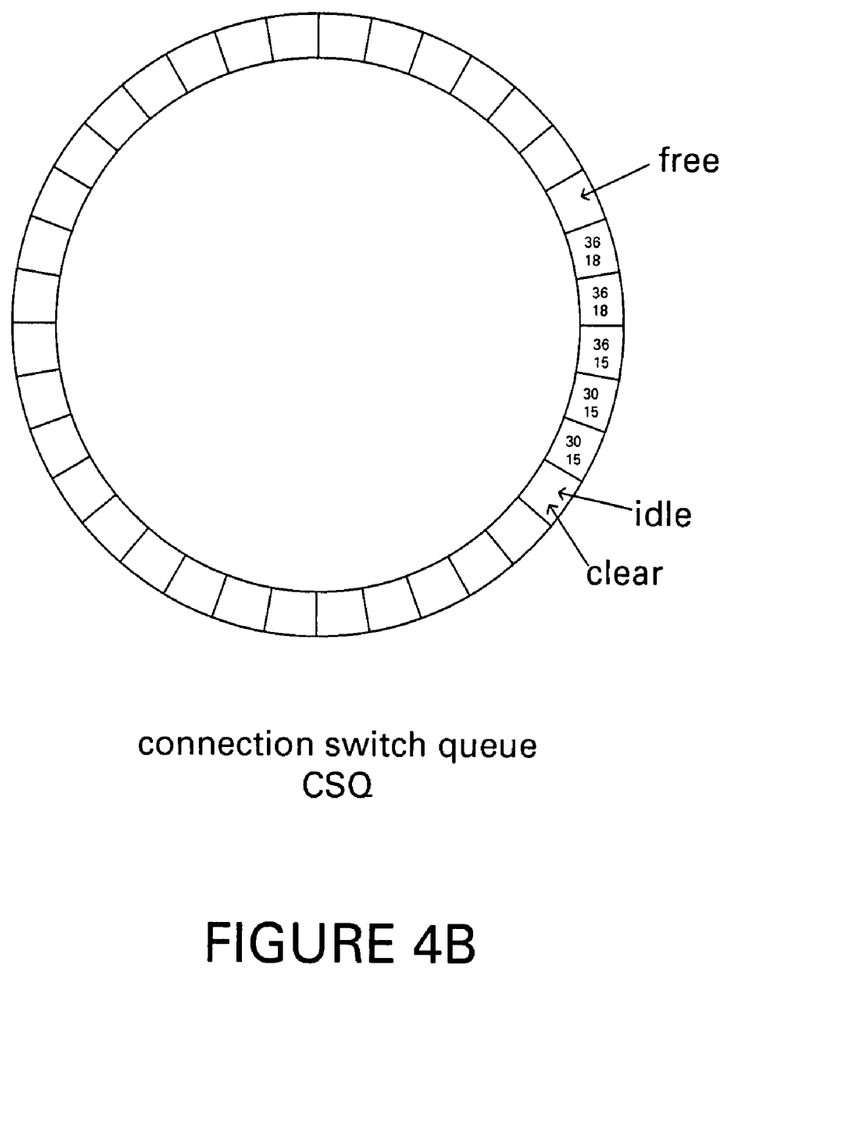
Figure 4C:
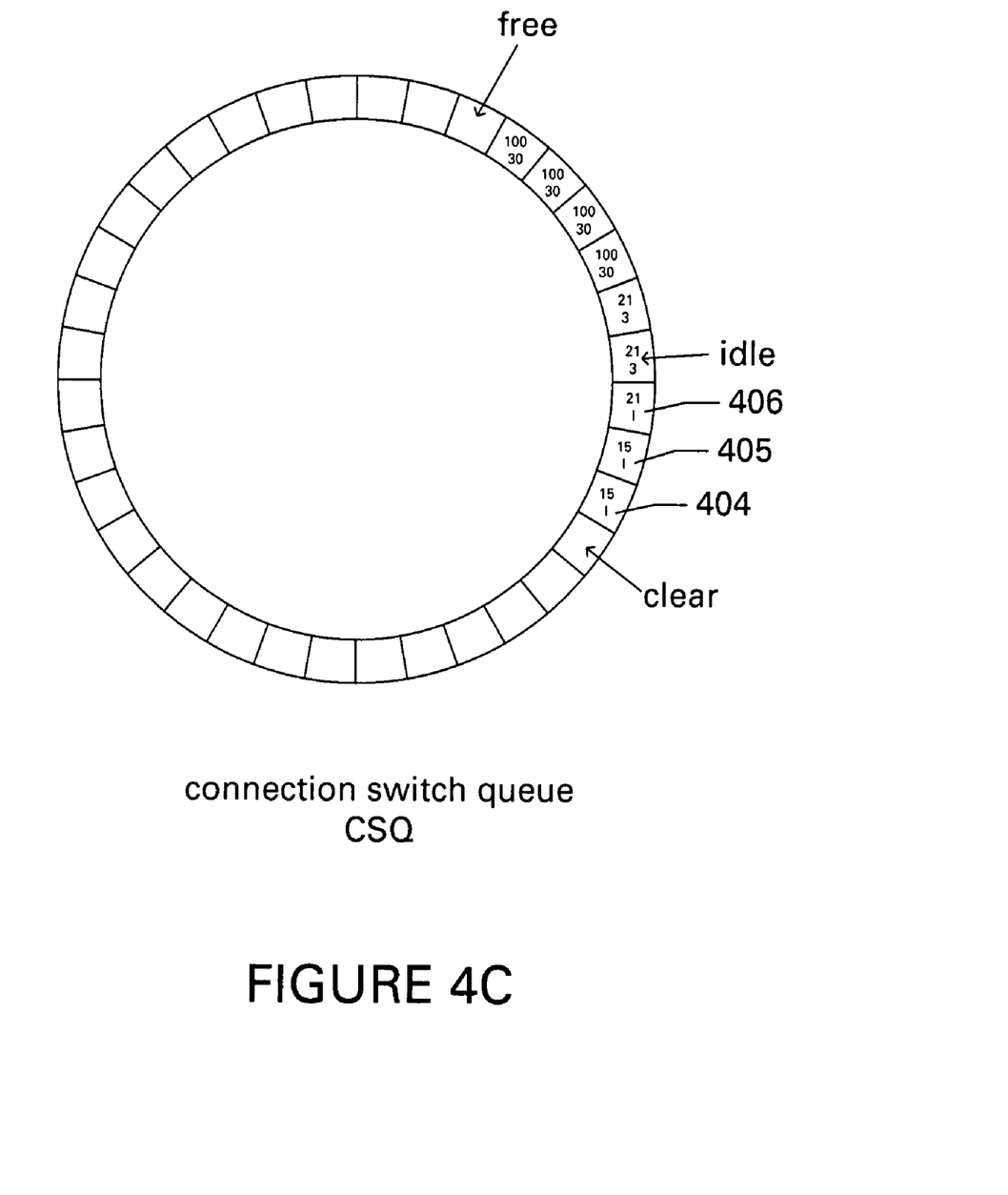
Figure 4D:
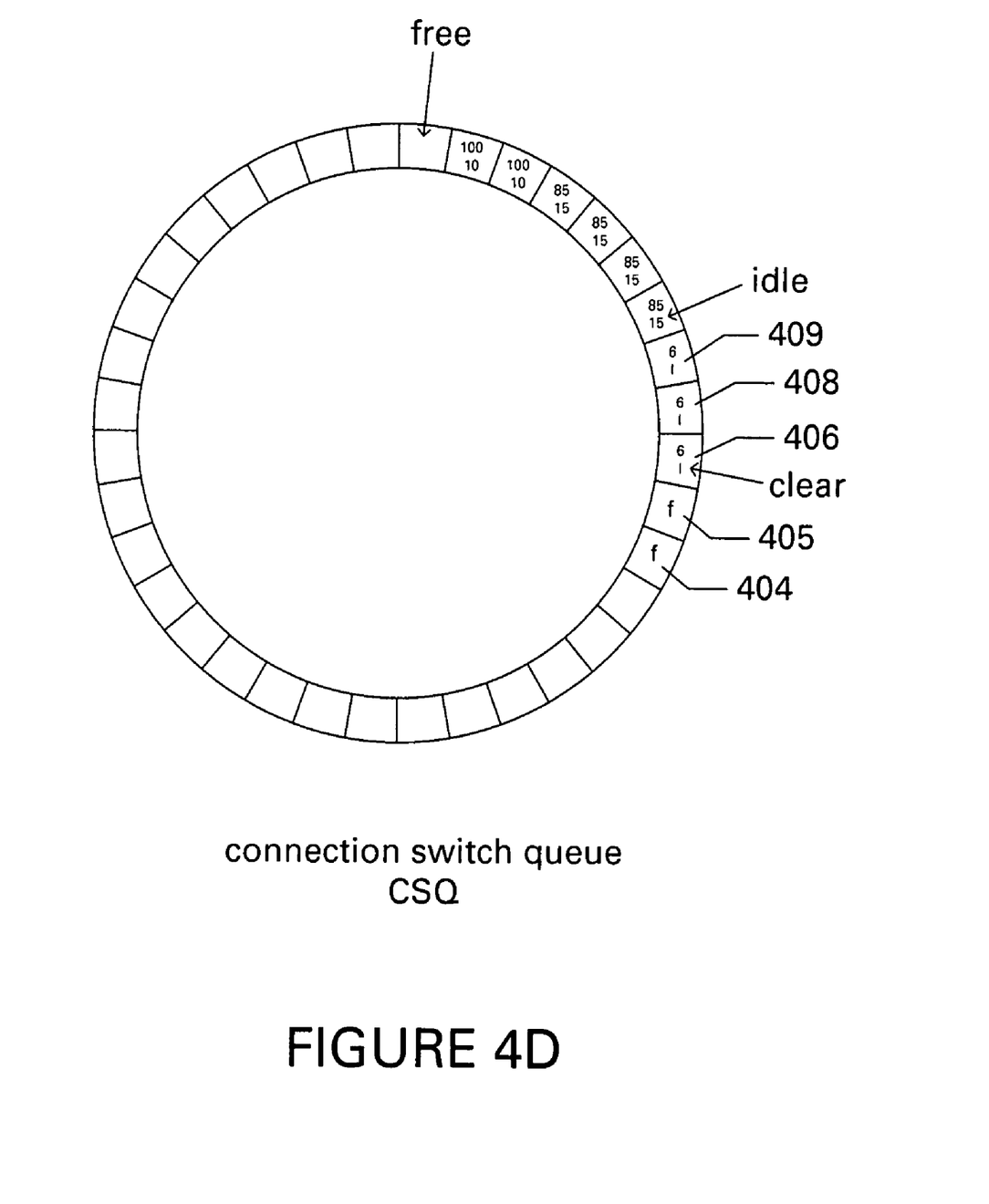

FIGS. 4A-D illustrate a second embodiment of the present invention. As shown in FIG. 4A, the second embodiment also comprises a CSQ, but this CSQ is associated with three pointers: (1) free; (2) idle; and (3) clear. In addition, as shown in FIG. 4B, each CSQ entry is associated with two timer values. One timer value is referenced and used during advancement of the pointer "idle," and the other timer value is referenced and used by the pointer "clear" during advancement of the clear pointer. The pointers "free" and "idle" operate identically to operation of these pointers in the first embodiment, described with reference to FIGS. 3A-F. The pointer "clear" operates similar to operation of the pointer "idle," except that, when clear is advanced, the status of CSQ entries with expired clear-pointer-associated timers is changed from idle or active to free in the case that the entry has not been accessed since the clear-pointer-associated timer was set and the clear-pointer-associated timer has expired. Thus, the third pointer "clear" allows a different timer to be associated with CSQ entries so that, should the CSQ entries be inactive for a length of time specified by the clear-pointer-associated timer, the CSQ entry is reclaimed for reallocation, rather than lingering in the idle stage. FIG. 4C shows the CSQ of FIG. 4B following ten fifteen clock ticks, in which three CSQ entries 404-406 have been changed from active status to idle status, and FIG. 4D shows the CSQ in FIG. 4C following 15 additional clock ticks, in which two additional CSQ entries 408-409 have been changed from active status to idle status, and two CSQ entries 404 and 405 have been changed from idle status to free status as a result of expiration of the clear-pointer-associated timers in those CSQ entries.

In alternative embodiments, a clear-pointer may be employed, but each CSQ entry may be associated with only a single timer. In these embodiments, access to entries are monitored, so that entries are freed by clear-pointer-associated operations for lack of access during the life of the entry, and are other set to idle at timer expiration.

Figure 5:
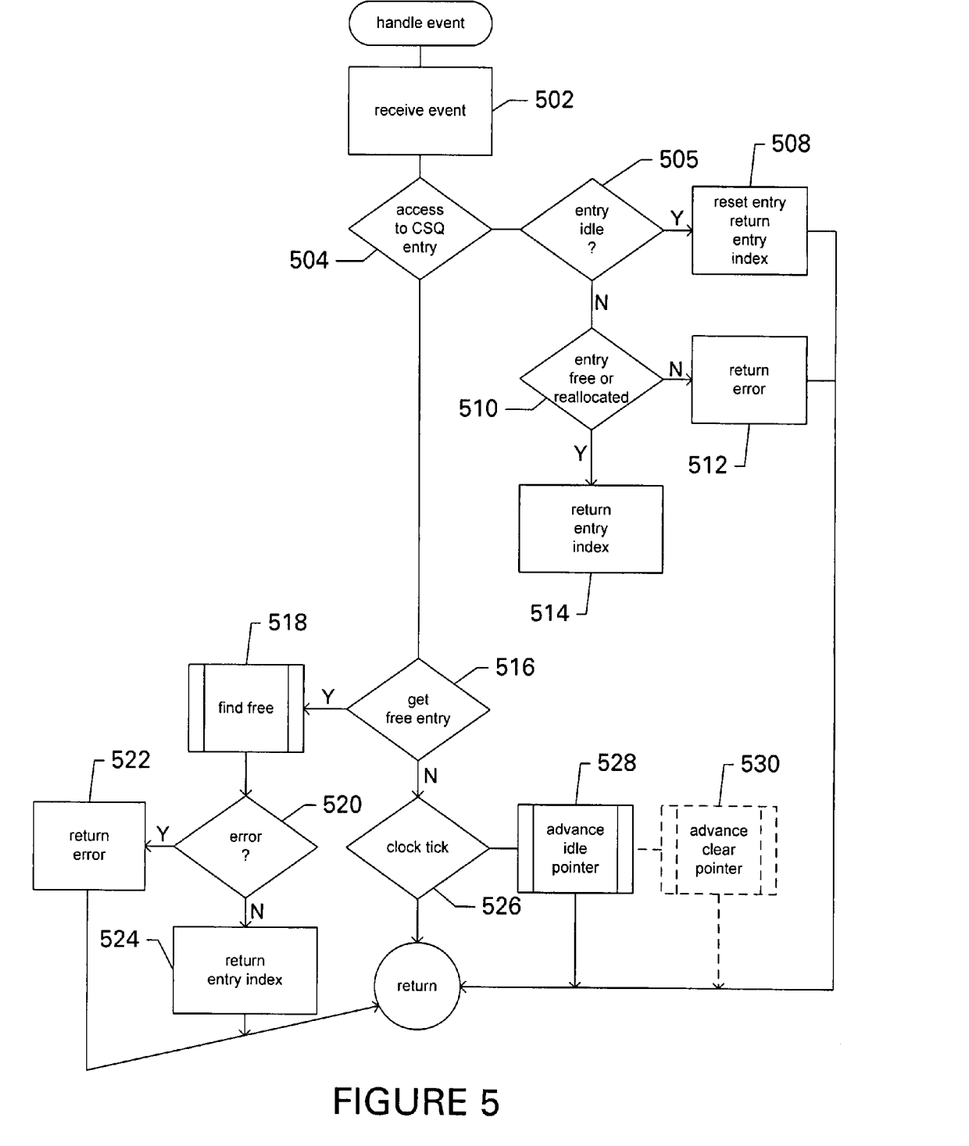
FIG. 5 is a control-flow diagram illustrating CSQ management according to one embodiment of the present invention.

FIG. 5 is a control-flow diagram illustrating CSQ management according to one embodiment of the present invention. CSQ management is directed by the occurred of various types of events. Thus, the routine "handle event" shown in FIG. 5 carries out CSQ management by handling CSQ-related events. In step 502, a next event is received. If this event represents an access to the CSQ entry as determined in step 504, and the entry is currently in the idle status, as determined in step 505, then the status of the entry is reset to active, in step 508, and the index of the entry is returned. If the entry is free, rather than idle, as determined in step 510, then an error is returned, in step 512, to indicate to an accessing routine that the entry has expired. Similarly, in step 510, an error is returned if the entry has been reallocated. Reallocation of an entry can be detected by additional data values associated with the CSQ entry, including source and destination addresses, exchange or connection numbers, or other such data entries. If the entry is active, then the entry index is returned in step 514. If the event is an attempt to acquire or allocate a CSQ entry, as determined in step 516, then the routine "find free" is called in step 518. If this routine, described below, returns an error, as determined in step 520, then an error is returned to the routine attempting to obtain a free entry in step 522. Otherwise the index of the entry found by the routine "find free" is returned in step 524. If the event is a clock tick or elapse of a fixed interval of time, as determined in step 526, then a routine is called to advance the idle pointer in step 528 and, optionally, when the CSQ includes a clear pointer, a routine is called to advance the clear pointer in step 530.

Figure 6:
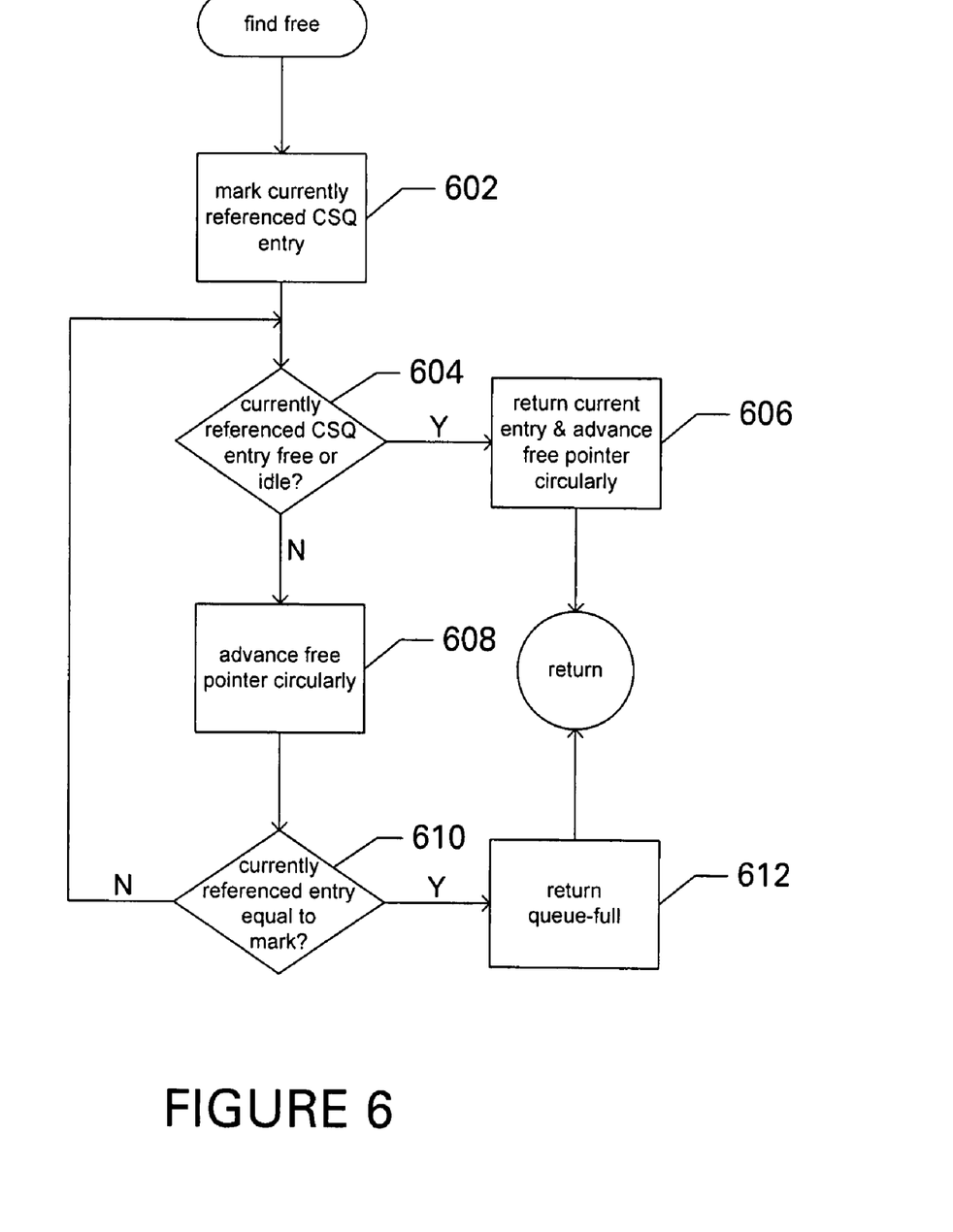
FIG. 6 is a control-flow diagram for the routine "find free" called in step 518 of FIG. 5.

FIG. 6 is a control-flow diagram for the routine "find free" called in step 518 of FIG. 5. In step 602, the entry currently referenced by the free pointer is marked. If the entry currently referenced by the free pointer is free or idle, and determined in step 604, then the index of that entry is returned and the free pointer is circularly advanced in step 606. Otherwise, in step 608, the free pointer is circularly advanced. If the currently referenced entry is equal to the entry marked in step 602, as determined in step 610, then a queue-full error is returned in step 612.

Figure 7:
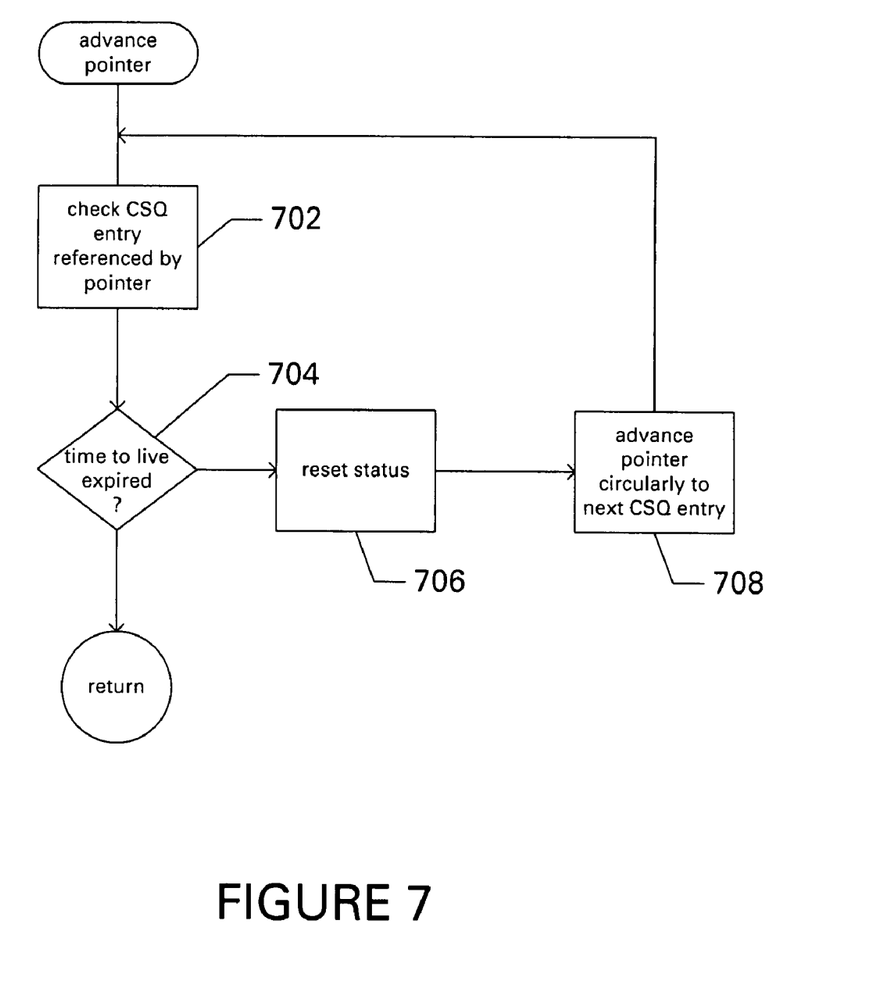
FIG. 7 shows a control-flow diagram for the routine "advance pointer."

FIG. 7 shows a control-flow diagram for the routine "advance pointer." In step 702, the CSQ entry referenced by the pointer is checked, if the timer associated with the pointer to be advanced has expired, in step 704, then the status of the CSQ entry is appropriately reset, in step 706, and the pointer is circularly advanced to the next CSQ entry in step 708. The status is reset to idle when the pointer "idle" is advanced, and the status is set to "free" when the pointer "clear" is advanced and the entry has not been accessed during its lifetime or while the clear-pointer-associated timer had not expired.

Although the present invention has been described in terms of particular embodiments, it is not intended that the invention be limited to these embodiments. Modifications within the spirit of the invention will be apparent to those skilled in the art. For example, while in the above-described embodiments, CSQ entries have certain specified status values, in alternative embodiments, a fewer or greater number of status values may be associated with CSQ entries. The CSQs may include additional pointers and additional CSQ-entry-associated timers to allow for additional types of timer-expiration-related status changes. CSQs may be of arbitrary size and implemented using a variety of different techniques and data structures. The CSQ-associated-pointer advance may occur at fixed clock ticks, at regular intervals, or more or less continuously. Any number of different CSQ-management routines, in any number of different programming languages using any number of different types of control structures, data structures, modular organizations, and other such program parameters can be implemented, according to the needs and capabilities of these systems in which CSQ data structures are used. As discussed above, CSQ data structures may be used in environments other than proxy connection-associated-resource management.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A system for managing a data-resource queue, the system comprising:
   an electronic memory;
   a connection switch queue that contains entries, stored in the electronic memory, each associated with a timer;
   a free pointer that points to a next connection-switch-queue entry that may be allocated; and
   an idle pointer that points to a connection-switch-queue entry that is next due to expire.

2. A connection-switch queue, implemented in an electronic memory, that manages connection-associated resources for a communications proxy, the connection-switch queue comprising:
   an array of connection-switch-queue entries, stored in the electronic memory, each occupied entry of which includes an indication of an expiration time, an indication of a status, and connection-associated data or a reference to connection-associated data;
   management routines that employ modular arithmetic to circularize the array of connection-switch-queue entries with respect to pointer operations and connection-switch-queue indexing and that implement connection-switch-queue operations;
   a free pointer that references a next connection-switch-queue entry into which connection-associated data or a reference to connection-associated data can next be stored; and
   an idle pointer that references a first connection-switch-queue entry that will next expire.

3. The connection-switch queue of claim 2 wherein the indication of status in each connection-switch-queue entry indicates one of:
   a free status, indicating that the connection-switch-queue entry has not yet been allocated;
   an active status, indicating that the connection represented by the connection-switch-queue entry is active; and
   an idle status, indicating that the connection represented by the connection-switch-queue entry is idle.

4. The connection-switch queue of claim 3 wherein the management routines locate a next available connection-switch-queue entry by:
   accessing the connection-switch-queue entry referenced by the free pointer;
   when the indication of status in the connection-switch-queue entry referenced by the free pointer indicates a free status or an idle status,
      selecting the connection-switch-queue entry referenced by the free pointer as the next available connection-switch-queue entry, and
      advancing the free pointer circularly by modular arithmetic; and when the indication of status in the connection-switch-queue entry referenced by the free pointer indicates an active status;
advancing the free pointer circularly by modular arithmetic until either the indication of status in the connection-switch-queue entry referenced by the free pointer indicates a free status or an idle status, in which case the connection-switch-queue entry referenced by the free pointer is selected as the next available connection-switch-queue entry and the free pointer advanced circularly by modular arithmetic by one entry, or until all connection-switch-queue entries have been considered, in which case the connection-switch queue is full.

5. The connection-switch queue of claim 3 wherein the management routines locate a particular connection-switch-queue entry for access by:
accessing the particular connection-switch-queue entry;
when the indication of status in the connection-switch-queue entry referenced by the free pointer indicates an idle status,
resetting the indication of status in the connection-switch-queue entry to indicate an active status, and
returning a reference to the particular connection-switch-queue entry; and
when the indication of status in the connection-switch-queue entry referenced by the free pointer indicates a free status or has been re-allocated,
returning an error.

6. The connection-switch queue of claim 3 wherein the management routines process the connection-switch queue at each time interval by:
while the indication of the expiration time in the connection-switch-queue entry referenced by the idle pointer indicates that the connection-switch-queue entry has expired,
resetting the indication of status in the connection-switch-queue entry referenced by the idle pointer to indicate a status of idle; and
advancing the idle pointer circularly by modular arithmetic by one entry.

7. The connection-switch queue of claim 3 further including a clear pointer and wherein each connection-switch-queue entry additionally includes an indication of clear-pointer expiration time.

8. The connection-switch queue of claim 7 wherein the management routines process the connection-switch queue at each time interval by:
while the indication of clear-pointer expiration time in the connection-switch-queue entry referenced by the clear pointer indicates that the connection-switch-queue entry has expired,
resetting the indication of status in the connection-switch-queue entry referenced by the clear pointer to indicate a status of free; and
advancing the clear pointer circularly by modular arithmetic by one entry.

9. A communications proxy device or computer executing a connection-switch queue for managing connection-associated resources, the connection-switch queue comprising:
an array of connection-switch-queue entries, stored in an electronic memory, each occupied entry of which includes an indication of an expiration time, an indication of a status, and connection-associated data or a reference to connection-associated data;
management routines that employ modular arithmetic to circularize the array of connection-switch-queue entries with respect to pointer operations and connection-switch-queue indexing and that implement connection-switch-queue operations;
a free pointer that references a next connection-switch-queue entry into which connection-associated data or a reference to connection-associated data can next be stored; and
an idle pointer that references a first connection-switch-queue entry that will next expire.

* * * * *